(12) United States Patent
Hur et al.

(10) Patent No.: US 12,282,354 B2
(45) Date of Patent: Apr. 22, 2025

(54) DISPLAY DEVICE

(71) Applicant: LG ELECTRONICS INC., Seoul (KR)

(72) Inventors: Hoon Hur, Seoul (KR); Bumseok Shon, Seoul (KR); Kangsuk Lee, Seoul (KR); Myoungku Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 99 days.

(21) Appl. No.: 18/133,718

(22) Filed: Apr. 12, 2023

(65) Prior Publication Data

US 2024/0311068 A1  Sep. 19, 2024

(30) Foreign Application Priority Data

Mar. 13, 2023  (KR) ........................ 10-2023-0032754

(51) Int. Cl.
*G06F 1/16* (2006.01)
*G06F 3/14* (2006.01)
*G09F 9/302* (2006.01)

(52) U.S. Cl.
CPC .......... *G06F 1/1601* (2013.01); *G06F 1/1607* (2013.01); *G06F 3/1446* (2013.01); *G09F 9/3026* (2013.01)

(58) Field of Classification Search
CPC ..... G06F 3/1446; G06F 1/1601; G09F 9/3026
See application file for complete search history.

(56) References Cited

U.S. PATENT DOCUMENTS

| | | | |
|---|---|---|---|
| 10,372,401 B2* | 8/2019 | Ryu | G06F 3/1446 |
| 10,531,581 B2* | 1/2020 | Seo | H01L 25/105 |
| 11,935,440 B2* | 3/2024 | Yoon | G09F 9/301 |
| 2016/0231976 A1 | 8/2016 | Ryu et al. | |
| 2019/0277377 A1* | 9/2019 | Heo | F16H 19/02 |
| 2022/0022330 A1* | 1/2022 | Dewaele | F16M 13/02 |
| 2022/0244901 A1* | 8/2022 | Li | G06F 3/1446 |

FOREIGN PATENT DOCUMENTS

| | | | | |
|---|---|---|---|---|
| CN | 113990210 A | * | 1/2022 | ........... G09F 9/3026 |
| CN | 114360361 A | * | 4/2022 | ........... G06F 3/1446 |
| KR | 10-2016-0097599 A | | 8/2016 | |
| KR | 10-2027851 B1 | | 11/2019 | |

* cited by examiner

*Primary Examiner* — Nidhi Thaker
(74) *Attorney, Agent, or Firm* — Birch, Stewart, Kolasch & Birch, LLP

(57) ABSTRACT

The present embodiment includes a plurality of panels; a plurality of fastening jigs respectively fastened to the plurality of panels; and an assembly machine moving each of the plurality of fastening jigs in an oblique direction to gather the plurality of panels to be arranged in a vertical direction and a horizontal direction or to separate the plurality of panels in the vertical direction and the horizontal direction.

11 Claims, 8 Drawing Sheets

DISPLAY DEVICE

CROSS-REFERENCE TO RELATED APPLICATIONS

The present application claims priority under 35 U.S.C. 119 and 35 U.S.C. 365 to Korean Patent Application No. 10-2023-0032754, filed on Mar. 13, 2023, which is hereby incorporated by reference in its entirety.

BACKGROUND

In recent display devices, a plurality of display modules including a display panel are arranged together to form a large-sized screen.

The display device may realize a large-sized screen by combining a plurality of display panels.

An example of a display device in which a plurality of display panels are arranged is disclosed in a display module disclosed in Korean Patent Publication No. 10-2016-0097599 A (published on Aug. 18, 2016), and a display device including the same, and such a display device includes a cabinet; and a display module having a plurality of LED panels disposed in the cabinet.

SUMMARY

A display device according to the present embodiment includes a plurality of panels; a plurality of fastening jigs respectively fastened to the plurality of panels; and an assembly machine moving each of the plurality of fastening jigs in an oblique direction to gather the plurality of panels to be arranged in a vertical direction and a horizontal direction or to separate the plurality of panels in the vertical direction and the horizontal direction.

The assembly machine may include a frame; a plurality of moving bodies connected to each of the plurality of fastening jigs and disposed to move in an oblique direction along the frame; a plurality of driving shafts meshed with each of the plurality of moving bodies; a plurality of driven gears connected to each of the plurality of driving shafts; and a driving gear meshed with the plurality of driven gears.

The frame may include a gear box having a space in which the plurality of driven gears and the driving gear are accommodated; and a plurality of guides disposed to protrude from the gearbox in the oblique direction and guiding each of the plurality of moving bodies in the oblique direction.

Each of the plurality of guides may include a main guide body having a slide space in which the moving body slides; and at least one guide rod disposed on the main guide body in the oblique direction and slide-guided by one of the moving bodies.

The plurality of guides may include a first guide disposed to upwardly protrude from the gear box to a left side in the oblique direction; a second guide disposed to downwardly protrude from the gear box to the left side in the oblique direction; a third guide disposed to downwardly protrude from the gear box to a right side in the oblique direction; and a fourth guide disposed to upwardly protrude from the gear box to the right side in the oblique direction.

The plurality of moving bodies may include a first moving body guided along the first guide in the oblique direction; a second moving body guided along the second guide in the oblique direction; a third moving body guided along the third guide in the oblique direction; and a fourth moving body guided along the fourth guide in the oblique direction.

The assembly machine may further include a gear cover coupled to the gear box and covering the plurality of driven gears and the driving gear.

When each of the plurality of panels is gathered, each of the plurality of panels may cover the gear cover in front of the gear cover.

The assembly machine may further include a rotation shaft connected to the driving gear, and a handle connected to the rotation shaft.

A rotation shaft through-hole through which the rotation shaft passes through may be formed in the frame.

The handle may be connected to the rear end of the rotation shaft so as to be disposed at a rear of the frame.

The assembly machine may further include a gear cover coupled to the frame and covering the plurality of driven gears and the driving gear; and a rotation shaft support body installed on the gear cover and rotatably supporting the rotation shaft.

According to the present embodiment, each of the plurality of panels is moved in an oblique direction by the assembly machine, and the plurality of panels can be gathered close to each other or dispersed apart from each other, so that the service of the plurality of panels is easy.

In addition, since the plurality of panels are moved together by a simple operation of turning the handle, the structure of the assembly machine is simpler than when each of the plurality of panels is moved independently.

In addition, since the driven gear and the driving gear constituting the assembly machine are accommodated in the gear box, the driven gear and the driving gear can be protected by the gear box.

In addition, the gear cover may protect the driven gear and the driving gear from the front of the driven gear and the driving gear.

In addition, by separating the gear cover forward, driving gear and driving gear can be easily serviced.

In addition, each of the plurality of panels can cover the gear cover in front of the gear cover, the gear cover can be hidden, and the outer appearance can be improved.

In addition, the rotation shaft connected to the handle may be supported by the gear cover and the frame, and shaking or arbitrary rotation of the driving gear may be minimized.

DETAILED DESCRIPTION OF THE EMBODIMENTS

Hereinafter, detailed embodiments of the present disclosure will be described in detail with reference to the accompanying drawings.

Figure 1:
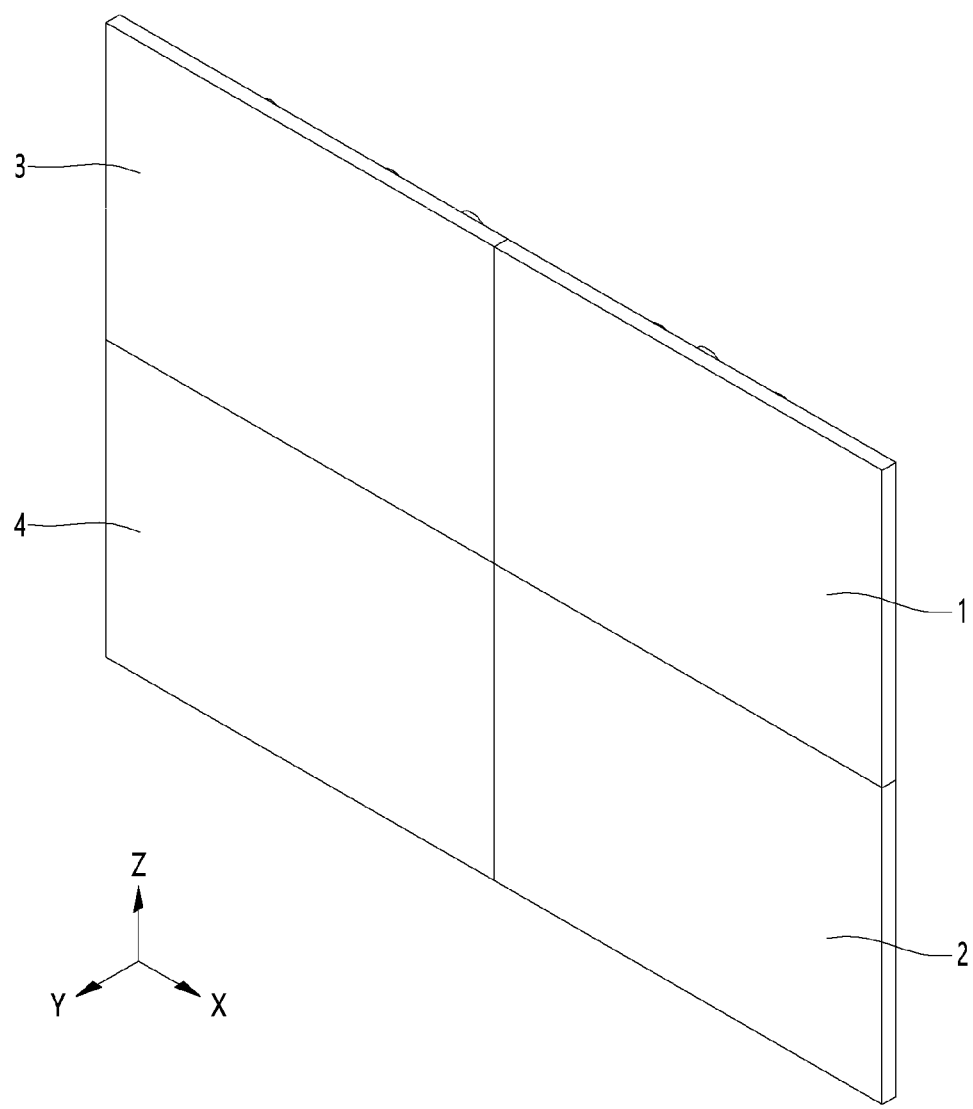
FIG. 1 is a perspective view illustrating after assembling a display device according to the present embodiment.
Figure 2:
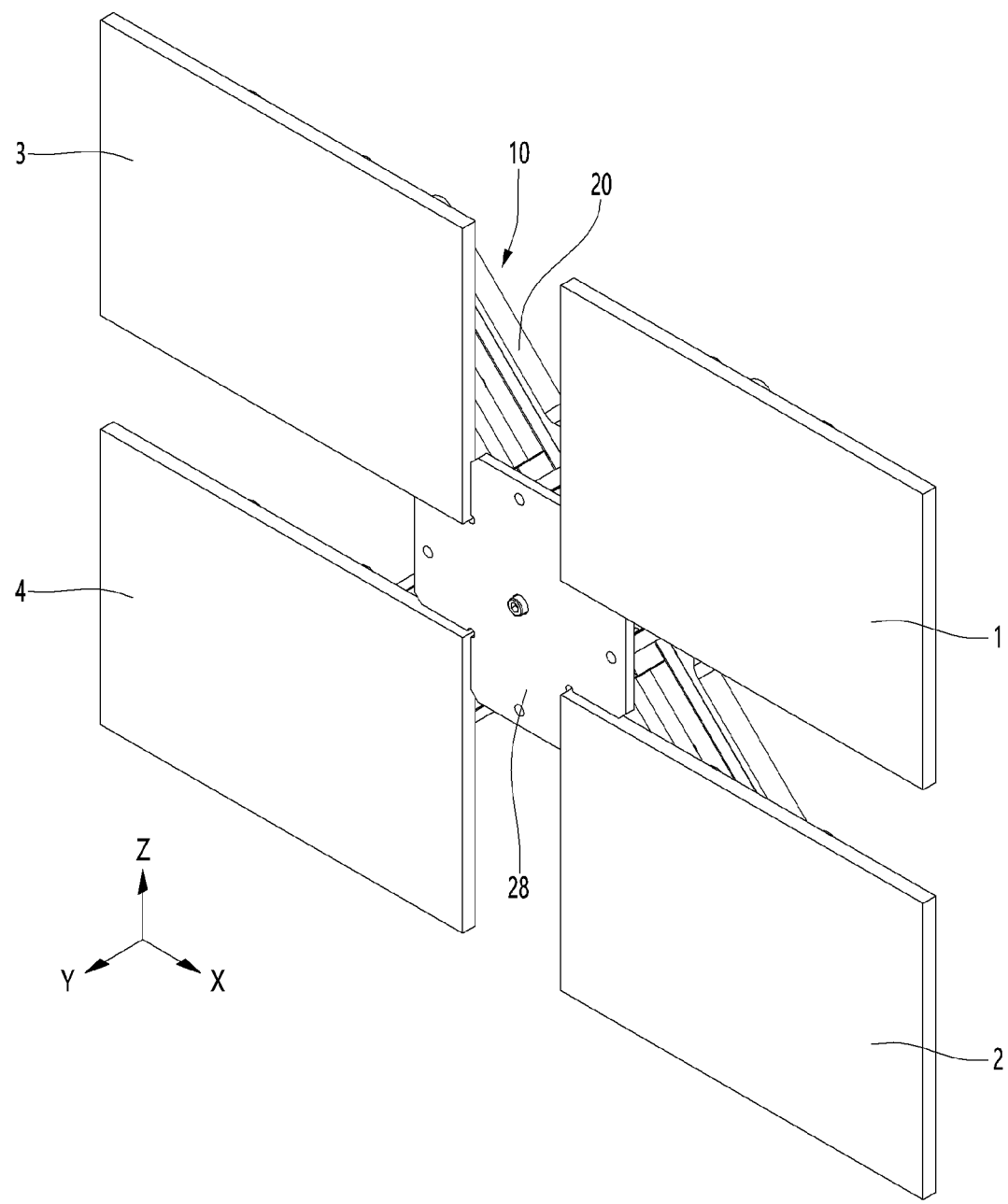
FIG. 2 is a perspective view illustrating before assembling the display device according to the present embodiment.
Figure 3:
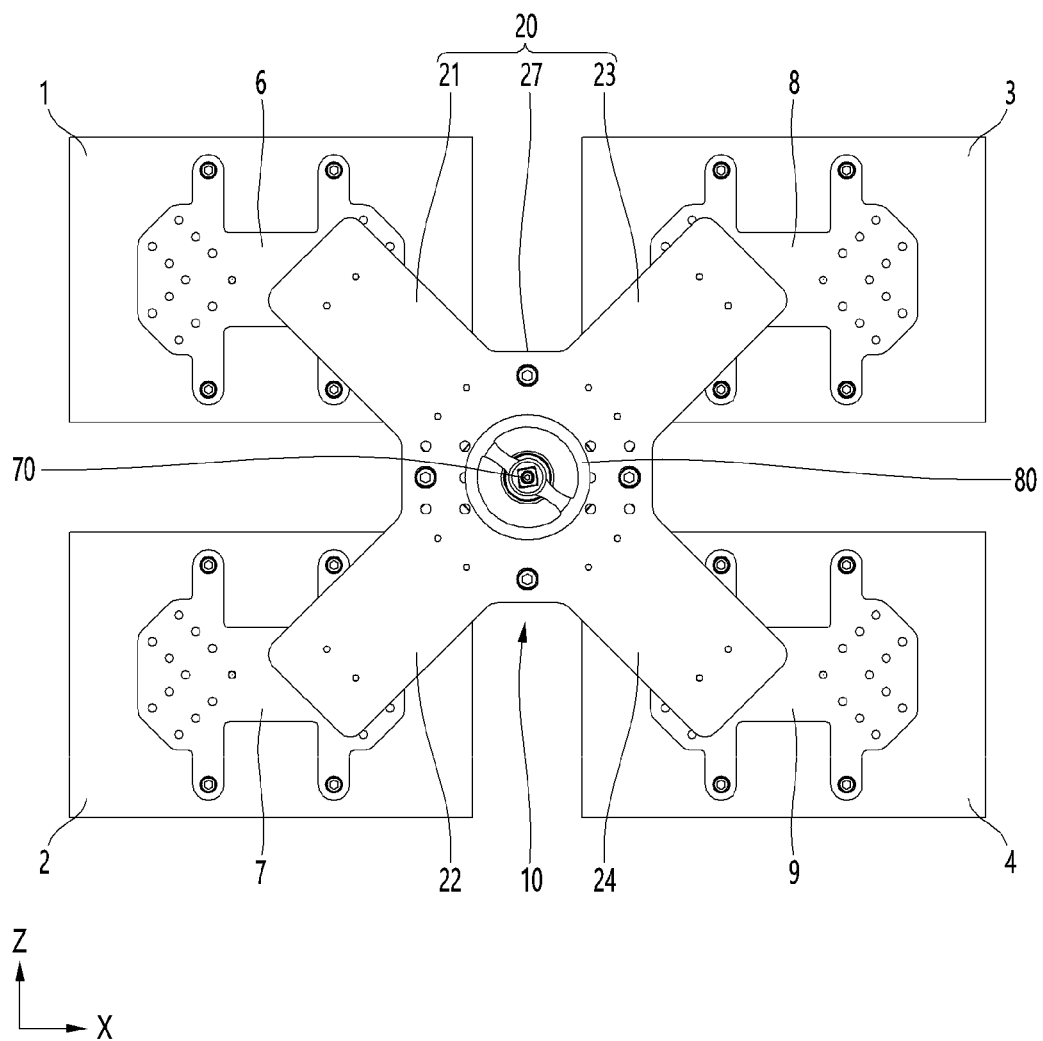
FIG. 3 is a rear view illustrating the display device illustrated in FIG. 2.
Figure 4:
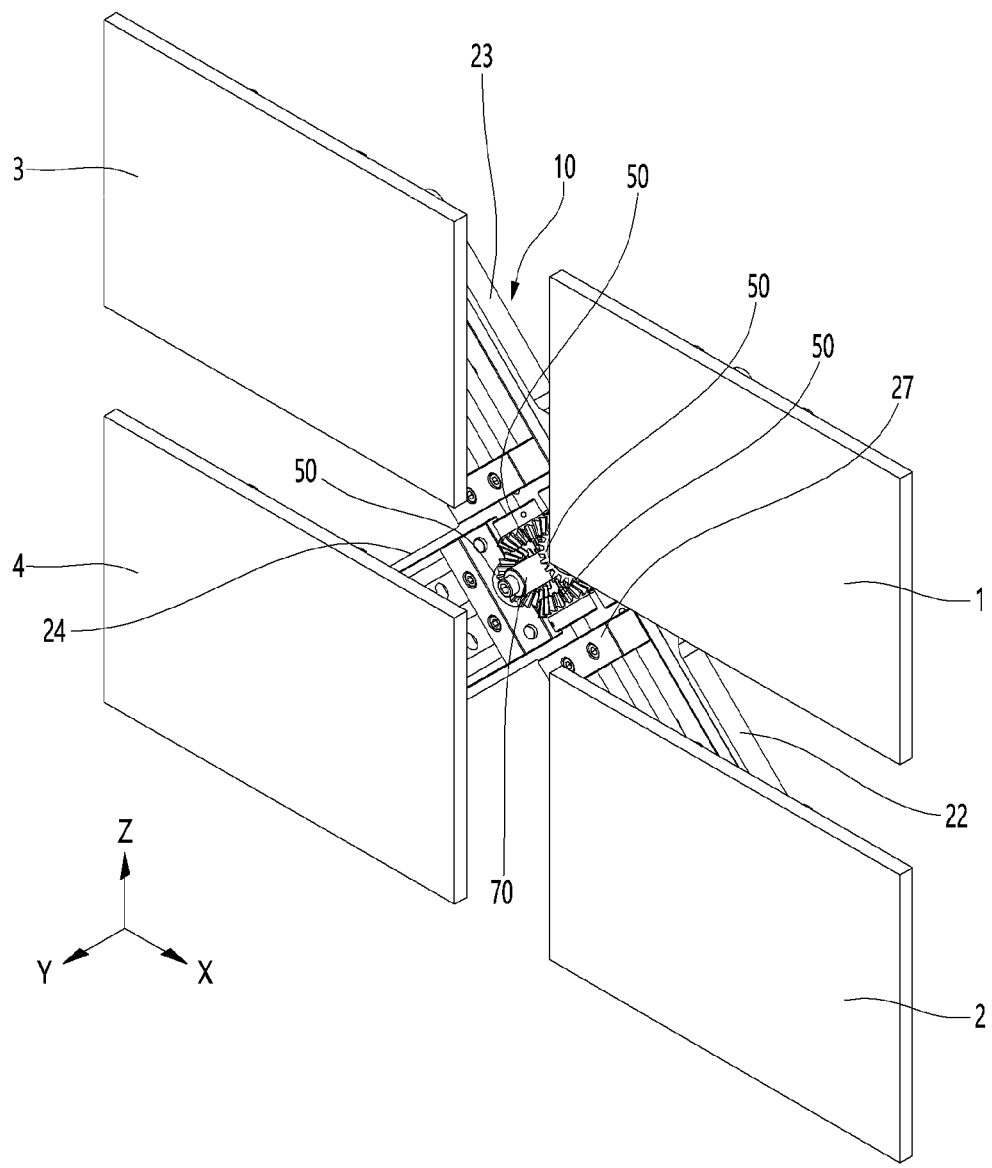
FIG. 4 is a perspective view illustrating when the gear cover is separated from the display device illustrated in FIG. 2.
Figure 5:
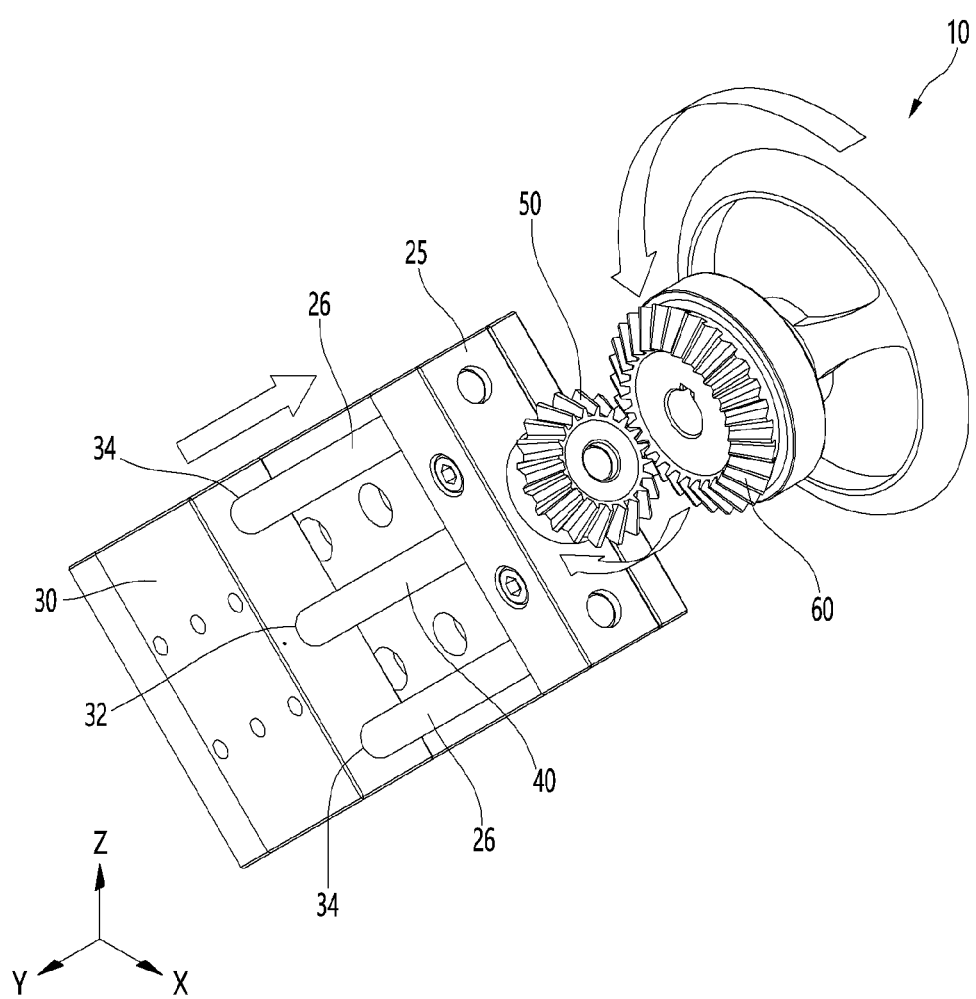
FIG. 5 is a perspective view illustrating a portion of an assembly machine of the display device according to the present embodiment.

FIG. 1 is a perspective view illustrating after assembling a display device according to the present embodiment, FIG. 2 is a perspective view illustrating before assembling the display device according to the present embodiment, FIG. 3 is a rear view illustrating the display device illustrated in FIG. 2, FIG. 4 is a perspective view illustrating when the gear cover is separated from the display device illustrated in FIG. 2, and FIG. 5 is a perspective view illustrating a portion of an assembly machine of the display device according to the present embodiment.

The display device may include a plurality of panels 1, 2, 3, and 4, a plurality of fastening jigs 6, 7, 8, and 9, and an assembly machine 10.

Each of the plurality of panels 1, 2, 3, and 4 may include a liquid crystal display (LCD), organic light emitting diode (hereinafter, OLED) display, plasma display panel (PDP), and the like.

Each of the plurality of panels 1, 2, 3, and 4 may include an LED Display Module (LDM) and, as illustrated in FIG. 1, may be gathered in the center to provide a single screen or may include a plurality of divided screens in a gathered state.

One example of each of the plurality of panels 1, 2, 3, and 4 may include one LED Display Module (LDM).

Another example of each of the plurality of panels 1, 2, 3, and 4 may include a plurality of LDMs in close contact with each other in the vertical direction Z and left and right direction X and a holder in which the plurality of LDMs are coupled.

The display device may include four panels 1, 2, 3, and 4, each of the four panels 1, 2, 3, and 4 may include four LDMs, and the four LDMs may be disposed in close contact in the vertical direction Z and in the left and right direction X. In this case, the display device may include 16 LDMs.

When the plurality of panels 1, 2, 3, and 4 includes four panels, the plurality of panels 1, 2, 3, and 4 may include the first panel 1 located on the upper left side, a second panel 2 located at the lower left side, a third panel 3 located at the upper right side, and a fourth panel 4 located at the lower right side.

As illustrated in FIG. 3, the plurality of fastening jigs 6, 7, 8, and 9 may be fastened to the plurality of panels 1, 2, 3, and 4, respectively. The fastening jig and the panel may correspond 1:1, and one fastening jig may be fastened to one panel. The size of the fastening jig may be smaller than the size of the panel, and the fastening jig may be fastened to the rear surface of the panel. The fastening jig may be fastened to the rear surface of the panel with a fastening member such as a screw. The fastening jig may not be visible because it is covered by the plurality of panels 1, 2, 3, and 4, when viewing the plurality of panels 1, 2, 3, and 4, from the front.

When the plurality of fastening jigs 6, 7, 8, and 9 are gathered as closely as possible, as illustrated in FIG. 1, the plurality of panels 1, 2, 3, and 4 may be brought into close contact with each other as closely as possible.

When the plurality of fastening jigs 6, 7, 8, and 9 are scattered apart from each other, as illustrated in FIG. 2, each of the plurality of panels 1, 2, 3, and 4 may be spaced apart from each other in the direction Z and in the left and right direction X.

The plurality of fastening jigs 6, 7, 8, and 9 may be spaced apart from each other in a left and right direction X and a vertical direction Z. The plurality of fastening jigs 6, 7, 8, and 9 may include a first fastening jig 6 fastened to the rear surface of the first panel 1, a second fastening jig 7 fastened to the rear surface of the second panel 2, a third fastening jig 8 fastened to the rear surface of the third panel 3, and a fourth fastening jig 9 fastened to the rear surface of the fourth panel 4.

The assembly machine 10 may move each of the plurality of fastening jigs 6, 7, 8, and 9 in an oblique direction. Here, the oblique direction may be defined as an inclined direction between the left and right direction X and the vertical direction Z.

The assembly machine 10 can move a plurality of fastening jigs 6, 7, 8, and 9 so that the plurality of panels 1, 2, 3, and 4 are arranged in the vertical direction Z and the left and right direction X, as illustrated in FIG. 1 and can assemble a plurality of panels 1, 2, 3, and 4. The assembly machine 10 may be an assembly tool or an assembler machine capable of gathering a plurality of panels 1, 2, 3, and 4.

The assembly machine 10 may move a plurality of fastening jigs 6, 7, 8, and 9 such that the plurality of panels 1, 2, 3, and 4 are spaced apart in the vertical direction Z and the left and right directions X, as illustrated in FIGS. 2 and 3 and can scatter a plurality of panels 1, 2, 3, and 4.

In other words, the assembly machine 10 may gather the plurality of panels 1, 2, 3, and 4 such that there is no or minimized gap between the plurality of panels 1, 2, 3, and 4 and when at least one of the plurality of panels 1, 2, 3, and 4 is serviced, all of the plurality of panels 1, 2, 3, and 4 may be spaced apart from each other.

The assembly machine 10 may include a frame 20, a plurality of moving bodies 30, a plurality of driving shafts 40, a plurality of driven gears 50, and a driving gear 60.

The frame 20 can support a plurality of moving bodies 30 movably and can support a plurality of driven gears 50 and the driving gear 60 rotatably.

One example of the frame 20 may be mounted on an installation frame installed on a wall, another example of the frame 20 may be fixed or movably disposed on a wall or ceiling, and the other example of the frame 20 may be fixed to a stand or placed movably at the stand.

The frame 20 may include a plurality of guides 21, 22, 23, and 24 and a gear box 27.

The plurality of guides 21, 22, 23, and 24 may be disposed to protrude from the gear box 27 in an oblique direction and guide each of the plurality of moving bodies 30 in an oblique direction.

Each of the plurality of guides 21, 22, 23, and 24 may include a main guide body 25 and at least one guide rod 26.

A slide space in which the moving body 30 slides may be formed inside the main guide body 25.

At least one guide rod 26 is disposed on the main guide body 25 in the oblique direction and one of the moving bodies 30 may slide on the at least one guide rod 26.

A pair of guide rods 26 may be provided to the main guide body 25. The pair of guide rods 26 may include an upper guide rod disposed parallel to the driving shaft 40 on an upper side of the driving shaft 40 and a lower guide rod disposed parallel to the driving shaft 40 on a lower side of the driving shaft 40.

The plurality of guides 21, 22, 23, and 24 may include a first guide 21 disposed to upwardly protrude from the gear box 27 to a left side in the oblique direction, a second guide 22 disposed to downwardly protrude from the gear box 27 to the left side in the oblique direction, a third guide 23 disposed to downwardly protrude from the gear box 27 to a right side in the oblique direction, and a fourth guide 24 disposed to upwardly protrude from the gear box 27 to the right side in the oblique direction.

The first guide 21 may be spaced apart from the second guide 22 in the vertical direction Z and may be spaced apart from the third guide 23 in the left and right direction X.

The second guide 22 may be located below the first guide 21 and may be spaced apart from the third guide 23 in the left and right direction X.

The third guide 23 may be located above the fourth guide 24.

The fourth guide 24 may be spaced apart from the third guide 23 in the vertical direction Z and may be spaced apart from the second guide 22 in the left and right direction X.

The gear box 27 may be a central portion of the frame 20. The gear box 27 may have a space in which a plurality of driven gears 50 and driving gear 60 are accommodated. The front surface of the gearbox 27 may be open.

The assembly machine 10 may further include a gear cover 28 coupled to the frame 20. The gear cover 28 may be coupled to the gear box 27 of the frame 20 and may cover a plurality of driven gears 50 and the driving gear 60.

The gear cover 28 may be a front panel of the assembly machine 10, protect the driven gear 50 and the driving gear 60, and minimize foreign substances such as dust from penetrating into the space of the gear box 27.

The gear cover 28 may be exposed from the front, as illustrated in FIG. 2 before assembling the plurality of panels 1, 2, 3, and 4. The gear cover 28 may be covered by the plurality of panels 1, 2, 3, and 4 as illustrated in FIG. 1 after assembling the plurality of panels 1, 2, 3, and 4.

When each of the plurality of panels 1, 2, 3, and 4 is gathered close to each other as illustrated in FIG. 1, each of the plurality of panels 1, 2, 3, and 4 can cover the gear cover 28 from the front of the gear cover 28.

As each of the plurality of panels 1, 2, 3, and 4 is scattered apart from each other, as illustrated in FIG. 2, the gear cover 28 is a plurality of panels 1, 2, 3, and 4 can be seen through the gaps between them.

The plurality of moving bodies 30 may be disposed to be connected to each of the plurality of fastening jigs 6, 7, 8, and 9 and to move along the frame 20 in an oblique direction.

The moving body 30 may have a 1:1 correspondence with the fastening jigs 6, 7, 8, and 9. One moving body 30 may be fastened to one fastening jig. When the display device includes four fastening jigs 6, 7, 8, and 9, the assembly machine 10 may include four moving bodies 30.

The size of the moving body 30 may be smaller than those of the guides 21, 22, 23, and 24, and the moving body 30 may be moved along the guides 21, 22, 23, and 24 in the longitudinal direction of the guides 21, 22, 23, and 24.

The moving body 30 may be formed in a three-dimensional shape, such as a rectangular parallelepiped or a regular hexahedron.

The moving body 30 may be fastened to the fastening jigs 21, 22, 23, and 24 using fastening members such as screws. The moving body 30 may be positioned between the fastening jigs 21, 22, 23, 24 and the frame 20 and may be concealed by the fastening jig 21, 22, 23, 24 and the frame 20.

The plurality of moving bodies 30 may include a first moving body guided along the first guide 21 in the oblique direction, a second moving body guided along the second guide 22 in the oblique direction, a third moving body guided along the third guide 23 in an oblique direction, and a fourth moving body guided along the fourth guide 24 in an oblique direction.

The plurality of driving shafts 40 may be meshed with each of the plurality of moving bodies 30. The driving shaft 40 and the moving body 30 may correspond 1:1. One moving body 30 may be meshed with one driving shaft 40.

The driving shaft 40 may be rotatably supported by the guides 21, 22, 23, 24 and the gear box 27.

A male screw may be formed on an outer surface of the driving shaft 40.

A through-hole 32 through which the driving shaft 40 passes may be formed in the moving body 30, and a female screw screwed to a male screw may be formed in the moving body 30. When the driving shaft 40 is rotated, the moving body 30 may move in the longitudinal direction of the driving shaft 40 along the driving shaft 40.

A guide hole 34 through which the guide rod 26 passes may be formed in the moving body 30.

The plurality of driving shafts 40 may include a first driving shaft rotatably supported by the first guide 21 and meshed with the first moving body, a second driving shaft rotatably supported by the second guide 22 and meshed with the second moving body, a third driving shaft rotatably supported by the third guide 23 and meshed with the third moving body, and a fourth driving shaft rotatably supported by the fourth guide 24 and meshed with the fourth moving body.

The plurality of driven gears 50 may be connected to each of the plurality of driving shafts 40. The driven gear 50 may be in 1:1 correspondence with the driving shaft 40. One driven gear 50 may be connected to one driving shaft 40, and when the driven gear 50 rotates, the driving shaft 40 may rotate together with the driven gear 50.

The plurality of driven gears 50 may be accommodated to be spaced apart from each other in the space of the gear box 27.

The plurality of driven gears 50 may include a first driven gear connected to the first driving shaft, a second driven gear connected to the second driving shaft, a third driven gear connected to the third driving shaft, and a fourth driven gear connected to the fourth driving shaft.

An example of the driven gear 50 may be a driven gear of a bevel gear and may transmit rotational force of the driving gear 60 to the driving shaft 40.

The driving gear 60 may be meshed with a plurality of driven gears 50. The number of driving gears 60 may be less than the number of driven gears 50. A plurality of driven gears 50 may be meshed with one driving gear 60.

The driving gear 60 may be accommodated in the space of the gear box 27 together with the plurality of driven gears 50.

The center of rotation of the driving gear 60 may be in the front and rear direction Y. An example of the driving gear 60 may be a driving gear of a bevel gear.

Figure 6:
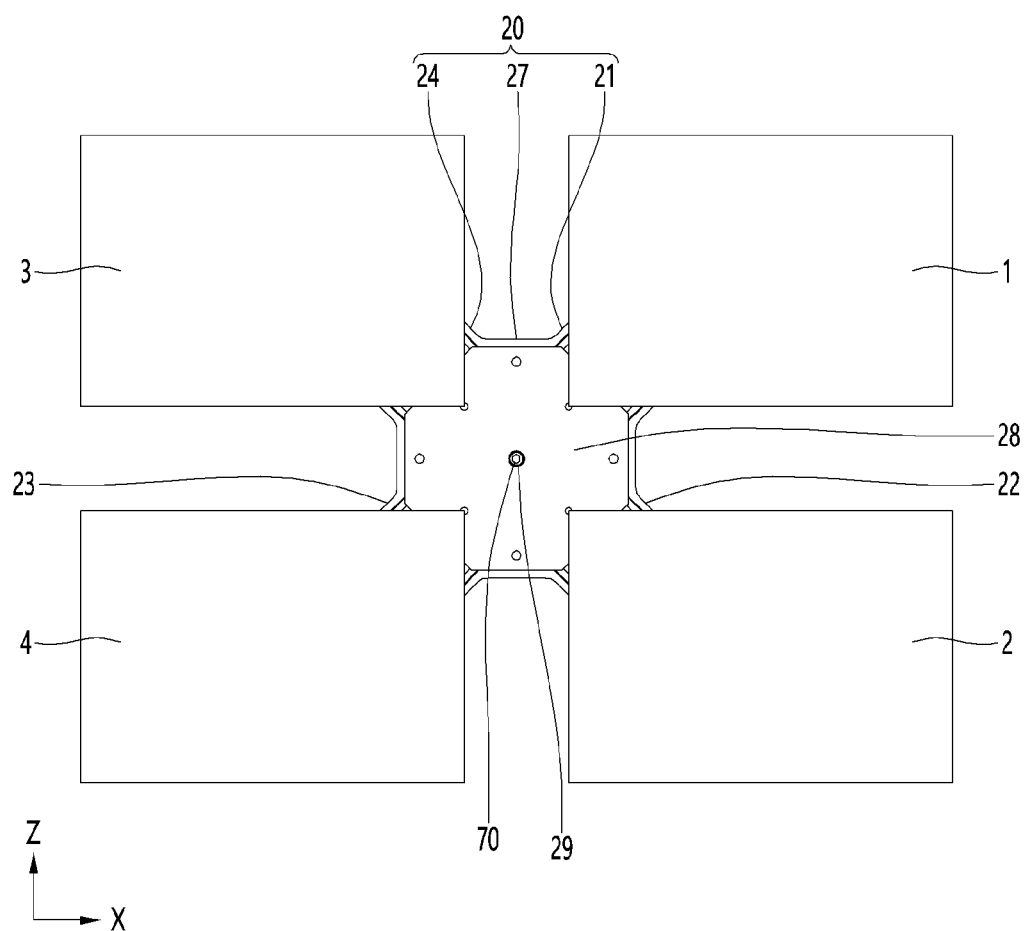
FIG. 6 is a front view illustrating before assembling the display device according to the present embodiment.
Figure 7:
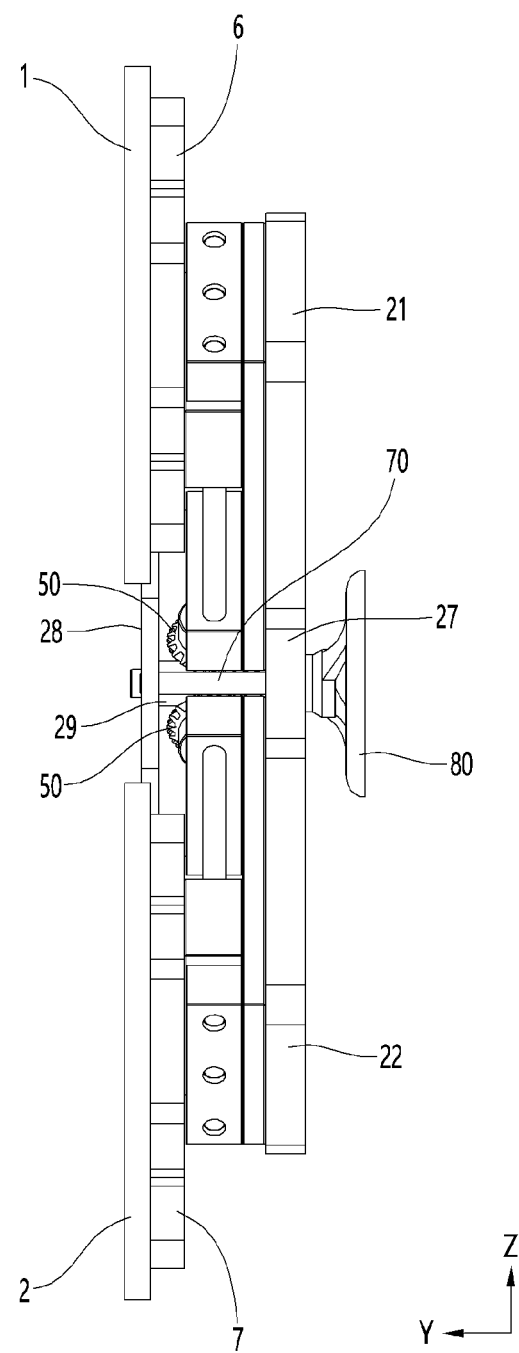
FIG. 7 is a side view illustrating before assembling the display device according to the present embodiment.
Figure 8:
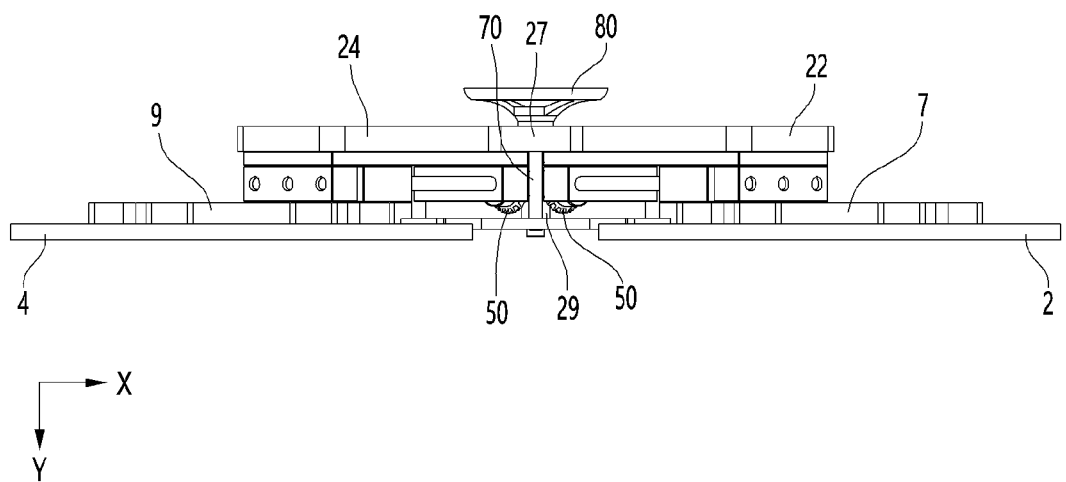
FIG. 8 is a plan view illustrating before assembling the display device according to the present embodiment.

FIG. 6 is a front view illustrating before assembling the display device according to the present embodiment, FIG. 7 is a side view illustrating before assembling the display device according to the present embodiment, and FIG. 8 is a plan view illustrating before assembling the display device according to the present embodiment.

The assembly machine 10 may further include a rotation shaft 70 connected to the driving gear 60 and a handle 80 connected to the rotation shaft 70.

A rotation shaft through-hole through which the rotation shaft 70 passes may be formed in the frame 10. The rotation shaft through-hole may be formed to pass through the rear of the driving gear 60 of the gear box 27 in the front and rear direction.

The assembly machine 10 may further include a rotation shaft support body 29 installed on the gear cover 28 and rotatably supporting the rotation shaft 70.

An example of the rotary shaft support body 29 may be a bearing that rotatably supports the rotary shaft 70. Another example of the rotation shaft support body 29 may be a bushing rotatably supporting the rotation shaft 70.

The rotation shaft 70 may be disposed long on the frame 20 in the front and rear direction Y.

The front end of the rotation shaft 70 may be rotatably supported by the rotation shaft support body 29.

The handle 80 may be connected to the rear end of the rotation shaft 70 to be disposed at the rear of the frame 10. The size of the handle 80 may be smaller than the size of the gear box 27 and may not be seen due to being covered by the gear box 27 when viewed from the front.

When the assembler assembling the display device rotates the handle 80 in one of clockwise and counterclockwise directions, the rotation shaft 70 can rotate the driving gear 60, and the driving gear 60 can rotate a plurality of driven gears 50, the driving shaft 40 connected to the driven gear 50 can be rotated, and the moving body 30 moves along the guide rod 26 and the driving shaft 40 in the direction of the gearbox 27. As the moving body 30 approaches the gear box 27, the plurality of panels 1, 2, 3, and 4 can be gathered in front of the gear cover 28, and the plurality of panels 1, 2, 3, and 4 are moved as closely as possible, assembly of the display device can be completed.

When servicing at least one of the plurality of panels 1, 2, 3, and 4, and if the operator reversely rotates the handle 80 in the other direction of clockwise and counterclockwise, then the rotation shaft 70 can be reversely rotated the driving gear 60, the driving gear 60 can reversely rotate the plurality of driven gears 50, the driving shaft 40 connected to the driven gear 50 can be reversely rotated, and the moving body 30 may be moved along the guide rod 26 and the driving shaft 40 in the opposite direction of the gear box 27. As the moving body 30 moves away from the gear box 27, the plurality of panels 1, 2, 3, and 4 may be scattered from the front of the gear cover 28 in the oblique direction, and the plurality of panels 1, 2, 3, and 4 may be spaced apart from each other in the vertical direction Z and in the left and right direction X.

The operator can separate and service only the panel requiring service, and the operator can easily separate and then reassemble the display device.

According to the present embodiment, each of the plurality of panels is moved in an oblique direction by the assembly machine, and the plurality of panels can be gathered close to each other or dispersed apart from each other, so that the service of the plurality of panels is easy.

In addition, since the plurality of panels are moved together by a simple operation of turning the handle, the structure of the assembly machine is simpler than when each of the plurality of panels is moved independently.

In addition, since the driven gear and the driving gear constituting the assembly machine are accommodated in the gear box, the driven gear and the driving gear can be protected by the gear box.

In addition, the gear cover may protect the driven gear and the driving gear from the front of the driven gear and the driving gear.

In addition, by separating the gear cover forward, driving gear and driving gear can be easily serviced.

In addition, each of the plurality of panels can cover the gear cover in front of the gear cover, the gear cover can be hidden, and the outer appearance can be improved.

In addition, the rotation shaft connected to the handle may be supported by the gear cover and the frame, and shaking or arbitrary rotation of the driving gear may be minimized.

The above-disclosed subject matter is to be considered illustrative, and not restrictive, and the appended claims are intended to cover all such modifications, enhancements, and other embodiments, which fall within the true spirit and scope of the present disclosure.

Thus, the embodiment of the present disclosure is to be considered illustrative, and not restrictive, and the technical spirit of the present disclosure is not limited to the foregoing embodiment.

Therefore, the scope of the present disclosure is defined not by the detailed description of the invention but by the appended claims, and all differences within the scope will be construed as being included in the present disclosure.

What is claimed is:

1. A display device comprising:
   a plurality of panels;
   a plurality of fastening jigs respectively fastened to the plurality of panels; and
   an assembly machine moving each of the plurality of fastening jigs in an oblique direction to gather the plurality of panels to be arranged in a vertical direction and a horizontal direction or to separate the plurality of panels in the vertical direction and the horizontal direction,
   wherein the assembly machine includes:
     a frame;
     a plurality of moving bodies connected to each of the plurality of fastening jigs and disposed to move in the oblique direction along the frame;
     a plurality of driving shafts meshed with each of the plurality of moving bodies;
     a plurality of driven gears connected to each of the plurality of driving shafts; and
     a driving gear meshed with the plurality of driven gears.

2. The display device of claim 1, wherein the frame includes:
   a gear box having a space in which the plurality of driven gears and the driving gear are accommodated; and
   a plurality of guides disposed to protrude from the gear box in the oblique direction and guiding each of the plurality of moving bodies in the oblique direction.

3. The display device of claim 2, wherein each of the plurality of guides includes:
   a main guide body having a slide space in which a moving body slides; and
   at least one guide rod disposed on the main guide body in the oblique direction and slide-guided by one of the plurality of moving bodies.

4. The display device of claim 2, wherein the plurality of guides includes:
   a first guide disposed to upwardly protrude from the gear box to a left side in the oblique direction;
   a second guide disposed to downwardly protrude from the gear box to the left side in the oblique direction;
   a third guide disposed to downwardly protrude from the gear box to a right side in the oblique direction; and
   a fourth guide disposed to upwardly protrude from the gear box to the right side in the oblique direction.

5. The display device of claim 4, wherein the plurality of moving bodies includes:
   a first moving body guided along the first guide in the oblique direction;
   a second moving body guided along the second guide in the oblique direction;
   a third moving body guided along the third guide in the oblique direction; and a fourth moving body guided along the fourth guide in the oblique direction.

6. The display device of claim 2, wherein the assembly machine further includes a gear cover coupled to the gear box and covering the plurality of driven gears and the driving gear.

7. The display device of claim 6, wherein, when each of the plurality of panels is gathered, each of the plurality of panels covers the gear cover in front of the gear cover.

8. The display device of claim 1, wherein the assembly machine further includes:
 a rotation shaft connected to the driving gear; and
 a handle connected to the rotation shaft.

9. The display device of claim 8, wherein a rotation shaft through-hole through which the rotation shaft passes through is formed in the frame.

10. The display device of claim 8, wherein the handle is connected to a rear end of the rotation shaft so as to be disposed at a rear of the frame.

11. The display device of claim 8, wherein the assembly machine further includes
 a gear cover coupled to the frame and covering the plurality of driven gears and the driving gear; and
 a rotation shaft support body installed on the gear cover and rotatably supporting the rotation shaft.

\* \* \* \* \*